(12) United States Patent
Ganeswaran et al.

(10) Patent No.: US 11,504,218 B2
(45) Date of Patent: Nov. 22, 2022

(54) DENTAL DISPLAY SYSTEM (71) Applicant: SYDEHEALTH LIMITED, London (GB)

(72) Inventors: Loven Ganeswaran, Epsom (GB); Kirishan Sivanandan, Brentford (GB)

(73) Assignee: Sydehealth Limited, London (GB)

( * ) Notice: Subject to any disclaimer, the term of this patent is extended or adjusted under 35 U.S.C. 154(b) by 228 days.

(21) Appl. No.: 16/954,117

(22) PCT Filed: Aug. 29, 2018

(86) PCT No.: PCT/GB2018/052437
§ 371 (c)(1),
(2) Date: Jun. 30, 2020

(87) PCT Pub. No.: WO2019/115986
PCT Pub. Date: Jun. 20, 2019

(65) Prior Publication Data
US 2021/0161632 A1 Jun. 3, 2021

(30) Foreign Application Priority Data
Dec. 15, 2017 (GB) ..................... 1721023

(51) Int. Cl.
G06F 1/16 (2006.01)
A61C 19/02 (2006.01)
F16M 13/02 (2006.01)

(52) U.S. Cl.
CPC ............. *A61C 19/02* (2013.01); *F16M 13/02* (2013.01); *G06F 1/1632* (2013.01); *A61C 2203/00* (2013.01)

(58) Field of Classification Search
CPC .... A61C 19/02; A61C 2203/00; A61G 15/14; F16M 13/02; G06F 1/1632
See application file for complete search history.

(56) References Cited

U.S. PATENT DOCUMENTS 3,950,086 A 4/1976 Schulman et al.
8,382,059 B2 2/2013 Le Gette et al.
(Continued)

FOREIGN PATENT DOCUMENTS

CN 201558191 U 8/2010
CN 204016750 U 12/2014
(Continued)

OTHER PUBLICATIONS

International Search Report and Written Opinion for PCT Application No. PCT/GB2018/052437, dated Nov. 27, 2018, 10 pages.

*Primary Examiner* — Jacob R Crum
(74) *Attorney, Agent, or Firm* — Stinson LLP (57) ABSTRACT

A dental display system comprising: an articulatable dental arm (78) and a portable-electronic-device-support assembly (75) the articulatable dental arm (78) extending through an articulatable-dental-arm receiving aperture (86) of the portable-electronic-device-support assembly (76). An arm attached to a support attachment means (106) of the portable-electronic-device-support assembly (76) and a portable-electronic-device holder (10) and the portable-electronic-device holder (10) is attached to the arm. A portable electronic device (20) is engaged between the first and second device engagement elements (14, 16) of the portable-electronic-device holder (10).

19 Claims, 6 Drawing Sheets (56) References Cited

U.S. PATENT DOCUMENTS

| | | |
|---|---|---|
| 9,019,698 B2 | 4/2015 | Thiers |
| 2004/0178312 A1 | 9/2004 | Parsons |
| 2006/0231713 A1* | 10/2006 | Crain .................... G01C 15/00 |
| | | 248/309.1 |
| 2009/0090824 A1* | 4/2009 | Unsworth .......... F16M 11/2071 |
| | | 248/302 |
| 2010/0038505 A1 | 2/2010 | Sonnenberg |
| 2011/0031287 A1 | 2/2011 | Le Gette et al. |
| 2011/0130632 A1 | 6/2011 | McGrail et al. |
| 2011/0303805 A1* | 12/2011 | Lau ..................... H05K 5/0204 |
| | | 248/125.8 |
| 2013/0021539 A1* | 1/2013 | Austin ................... F16M 11/24 |
| | | 348/836 |
| 2013/0118503 A1 | 5/2013 | Galatas |
| 2013/0314890 A1* | 11/2013 | Smith ................... G06F 1/1601 |
| | | 361/825 |
| 2014/0355200 A1 | 12/2014 | Thiers |
| 2015/0136644 A1 | 5/2015 | Major |
| 2015/0293563 A1 | 10/2015 | Wharrad et al. |

FOREIGN PATENT DOCUMENTS

| | | |
|---|---|---|
| CN | 104434457 A | 3/2015 |
| CN | 206243068 U | 6/2017 |
| CN | 206651963 U | 11/2017 |
| EP | 3 403 638 A1 | 11/2018 |
| WO | 2016196403 A1 | 12/2016 |

* cited by examiner

DENTAL DISPLAY SYSTEM

STATEMENT OF RELATED CASES

This application is a national application filed under 35 U.S.C. § 371 of International Application No. PCT/GB2018/052437, filed Aug. 29, 2018, which claimed priority to Patent Application No. GB1721023.8, filed Dec. 15, 2017, the entire contents of both of which are incorporated herein by reference in their entireties.

The present invention relates to portable-electronic-device holder. The invention further relates to a portable-electronic-device-support assembly for connecting an articulatable dental arm to a portable electronic device. The invention also relates to a dental display system.

During dental examination or treatment, a patient is typically seated or supine in a dental chair. It can be necessary or desirable to display information or entertainment to the patient before, during or after a dental examination or treatment, whilst the patient is in the dental chair.

This display of information may be for the purpose of informing the patient of procedural options along with, and/or for providing information to the patient relevant to the procedure. This can help the patient select the most suitable procedure for their circumstances. Alternatively, display of information may be for providing entertainment to the patient whilst the patient is undergoing examination or treatment to distract or relax the patient to enable the dental practitioner to Gaily about the procedure more effectively.

Conventionally, a dental practitioner may attempt to display information to the patient before or after the procedure by manually displaying the relevant procedure either on a physical document or displayed on a portable or static electronic device. The practitioner can be required to locate the physical document or portable electronic device if not immediately available, which can be time consuming, and either the physical document or the portable electronic device may not be suitable for use in a clinical environment. Additionally, the practitioner can be required to hold the device which therefore may not be stationary and therefore may be difficult for the patient to read. If a static electronic device is used, for example if it is fixed to a wall of the surgery, the device is usually positioned too far for the patient to be able to see clearly and/or immersively, so as not to impede the movement of the dental practitioner.

If attempting to display information and/or entertainment to the patient during the procedure, a further dental practitioner can be required to hold the portable device to be displayed to the patient, which therefore may be unsteady and thus difficult to view as well as requiring the continuous use of personnel which can be costly. Alternatively, the patient may be required to attempt to view the information on a static display device which may be difficult to see from the patient's seated or supine position.

The present invention seeks to provide a solution to these problems.

According to a first aspect of the present invention, there is provided dental display system comprising: an articulatable-dental-arm clamp, a support and a portable-electronic-device holder; the articulatable-dental-arm clamp having a first articulatable-dental-arm engagement element and a second articulatable-dental-arm engagement element in use arranged to define an articulatable-dental-arm receiving portion, and a support attachment means having an attachment member, the support having a clamp attachment aperture through which the attachment member is extendable; and the portable-electronic-device holder having a multi-part holder body including first and second device engagement elements defining a portable electronic device housing, attachment means for retaining the first and second device engagement elements of the holder body together; the first and/or second device engagement elements defining a viewing aperture to permit physical and/or optical access to the portable electronic device housing, a battery receiver on a back side of the holder body, the battery receiver for receiving a battery to power an in use portable electronic device received in the holder body, and a mounting element on the battery receiver, the portable-electronic-device holder being mountable to the support via the mounting element.

A battery receiver may allow for insertion of an auxiliary or main power supply which may allow the device to be powered if an internal battery of the device has discharged or is not present. This prevents or limits the requirement for having a mains power supply connected to the in use portable electronic device. The mounting element on the battery receiver allows for the battery receiver to be accessed despite the mounting element mounted to the support.

Preferably, the viewing aperture of the portable-electronic-device holder has an at least in part non-rectangular perimeter for increasing user access to a touchscreen of a portable electronic device received in the holder body.

According to a second aspect of the present invention, there is provided a portable-electronic-device holder for a dental display system, the holder comprising: a multi-part holder body having first and second device engagement elements defining a portable electronic device housing; attachment means for retaining the first and second device engagement elements of the holder body together; the first and/or second device engagement elements defining a viewing aperture to permit physical and/or optical access to the portable electronic device housing, the viewing aperture having an at least in part non-rectangular perimeter for increasing user access to a touchscreen of a portable electronic device received in the holder body; and an articulatable-arm mounting element on a back side of the holder body.

The first and second device engagement elements allow for the portable electronic device to be held by the holder whilst the viewing aperture allows for the user to interact with and/or view the screen of the portable electronic device. The holder therefore allows for the portable electronic device to be supported and used as an information display device particularly in a dental environment. The viewing aperture being at least in part non-rectangular allows for the holder to engage the device, and thus securely hold it, whilst additionally allowing for a user to access more of the screen than if viewing aperture was entirely rectangular. Accessing the screen of the device, including those portions at the edges of the screen, is especially important in the instance that the portable electronic device has a touch screen and therefore the ability to interact with the touch screen is maximised. This ability to maximise the extent to which the touch screen is accessible is important in a clinical environment, which can be time pressured, as this allows precise and convenient selection on the device.

Preferably, the housing may be a device recess for receiving the portable electronic device. A device recess allows for the portable electronic device to be enclosed within the holder body which can prevent or limit unauthorised access to the portable electronic device and can provide resistance to water or other fluids from impacting the device.

Advantageously, the first and second device engagement elements may be interengageable with the first device engagement element having a device front engagement surface and the second device engagement element having a device rear engagement element. This results in the device being held between the two engagement elements which can prevent the device from becoming dislodged from the holder body.

Beneficially, the viewing aperture may extend through the first device engagement element. Extending through the first device engagement element, which may here hold the front of the device, ensures that the front of the device is accessible.

In a preferable embodiment, the viewing aperture may have at least one non-linear edge extending at least in part away from a centreline of the viewing aperture. Optionally, the non-linear edge may be curvate. A non-linear edge extending away from the screen allows for the device to be held within the holder body whilst exposing the screen of the device and at least part of the front of the device adjacent to the screen of the device. The corners of the viewing aperture may thus engage the device closer to the screen than a centre of the edge of the viewing aperture engages the device. Thus, the device may be more securely held in place whilst providing more access to the screen than known embodiments.

Preferably, the battery receiver is a battery recess having a slot-shaped opening. A slot shape matches the typical shape of in use batteries.

Beneficially, the portable-electronic-device holder may further comprise a battery engagement slot which extends through a battery recess wall for enabling removal of the battery. If a battery engagement slot is used then a battery can be engaged by a user despite the battery being received entirely within the battery receiver. The battery can thus be manipulated out of the battery receiver without the requirement of the battery protruding out of the battery receiver.

Advantageously, the attachment means may include at least one fastener receiving aperture extending through at least part of the holder body. A fastener receiving aperture allows for the insertion of fasteners to connect the device engagement elements together. Fasteners typically are unfastenable and thus the device engagement elements may be unattached to allow removal of the device.

In a preferable embodiment portable-electronic-device holder may further comprise at least one handle which extends at an angle to a plane of the viewing aperture. Optionally, the two handles may be positioned at distal ends of the holder body to one another. A handle allows for ease of manipulation and repositioning of the device holder. The handles being angled in this way allows for ease of holding in the instance that the device holder is to be manually held and presented to a patient.

Additionally, the portable-electronic-device holder may further comprise at least one further aperture which extends through at least part of the first and/or second device engagement element for allowing optical access for an in use camera of the portable electronic device. A camera aperture allows for an optical path from an in use camera lens to the exterior of the holder to allow pictures or video to be taken by the portable electronic device whilst it is received within the holder.

Preferably, the portable-electronic-device holder may further comprise a device-button engagement element for enabling a user to activate a button on the portable electronic device, the device-button engagement element being a further aperture or formed from pliable material. In this way the user may trigger a function of the device whilst the device is still received within the holder such that it does not need to be removed.

According to a third aspect of the present invention there is provided a portable-electronic-device holder comprising a holder body for mounting a portable electronic device, the holder body including a viewing aperture having non-parallel longitudinally extending edges for in use both retaining and increasing user access to the portable electronic device, and an articulatable-arm mounting element on a back side of the holder body.

According to a fourth aspect of the present invention there is provided a portable-electronic-device support assembly for attachment to an articulatable dental arm, the portable-electronic-device support assembly comprising: a support for a portable electronic device; an articulatable-dental-arm clamp having a first articulatable-dental-arm engagement element and a second articulatable-dental-arm engagement element in use arranged to define an articulatable-dental-arm receiving portion, fastening means for fastening the first and second articulatable-dental-arm engagement elements to each other so that the first and second articulatable-dental-arm engagement elements engage at least a portion of the in use articulatable dental arm, and support attachment means for attaching the support to the articulatable-dental-arm engagement elements, the support attachment means being spaced apart from the fastening means and comprising a first attachment member and a second attachment member, the first attachment member being at least in part receivable within and fastenable to the second attachment member to prevent separation of the first and second attachment members.

The first or further attachment member being receivable in the second attachment member or attachment member prevents or limits axial separation thereof. This is important in the instance that an articulatable arm and/or display device may be attachable to the attachment members. The mass of either or both of these components may act to cause a moment about the interconnection of the attachment members, tending to uncouple them. By having one received within the other, a circumferential extent of an exterior of one of the attachment member or further attachment member may engage with a circumferential extent of an interior of the other of the attachment member or further attachment member, providing a barrier to their uncoupling. Being fastenable together thither increases this resistance to uncoupling, whilst allowing for releasable attachment when required.

Advantageously, the support for the portable electronic device includes a portable-electronic-device holder as described in the second aspect of the present invention.

Preferably, the portable-electronic-device-support assembly may thither comprise an articulatable-dental-arm adaptor insertable into the articulatable-dental-arm receiving aperture, the articulatable dental arm adaptor having an exterior surface complementary with the articulatable-dental-arm receiving aperture and an interior surface for engaging the articulatable dental arm. Optionally, the exterior surface of the adaptor has a rectangular cross-section and the interior surface of the adaptor has a circular lateral cross-section, or vice versa The articulatable dental arm adaptor allows for the same portable-electronic-device-support assembly to be attached to articulatable dental arms of yawing dimensions.

Advantageously, the attachment member and/or further attachment member may be cylindrical or substantially cylindrical. The cylindricality allows for the in-use support for the portable electronic device be rotatably attached to the articulatable-dental-arm clamp.

In a preferable embodiment, an end of the attachment member is at or adjacent to a plane defined by an exterior surface of the first articulatable-dental-arm engagement element. This spacing may be the minimum spacing of the attachment member and the first articulatable-dental-arm engagement element to allow articulation of the support relative to the clamp without impacting or clashing with the articulatable dental arm or the clamp. The minimum spacing ensures a more compact arrangement of the clamp.

Preferably, the articulatable-dental-arm receiving portion is discontinuous. Discontinuity can allow for greater range of the size and/or shape of the articulatable dental arm to be received.

Advantageously, the support attachment means may include a further attachment member, and the attachment member and the further attachment member have complementary screw threads to provide releasable fastening therebetween. Releasable fastening enables for easy on-site and/or intraoperative release and attachment of the attachment members to enable for the support to be attached and or removed as or when desired.

Beneficially, the attachment member includes a shaft through which the support is receivable, and a stop extending in a plane perpendicular to a longitudinal extent of the shaft. A shaft and stop enable the support to be easily attached as and when required.

In a preferable embodiment, a spacing arm may extend between the articulatable-dental-arm engagement elements and the support attachment means to provide spacing between the support and the in-use dental arm. Spacing between the articulatable dental arm and the support attachment means allows for the support to be spaced from the articulatable dental arm. Therefore, the support may have a greater range of motion given that it may not be impeded by the presence of the support.

Optionally, further may include fastening means for fastening the articulatable-dental-arm engagement elements together and the dental spacing arm extends at an angle to the fastening means of the articulatable-dental-arm engagement elements and a longitudinal extent of the attachment members. Extending at an angle to the fastening means allows for the spacing arm to extend in a more useful direction, for example towards the patient, whilst still allowing for the fastening means to be easily accessible.

Preferably, the spacing arm, first articulatable-dental-arm engagement element and second attachment member are unitarily formed. Unitary formation allows for easy installation.

Additionally, the spacing arm may include a support engagement member for engaging and bracing the support. This provides additional support against in-use loading created by the attachment of the support and the portable electronic device.

Beneficially, the support attachment means may have an engagement element. In a preferable embodiment, the engagement element may be a grub screw. The engagement element may allow for the arm to be attached to the portable-electronic-device-support assembly. The use of a grub screw allows a level of engagement of the engagement element with the portable-electronic-device-support assembly to be adjusted so as to either ease or limit rotation.

Preferably, the fastening means and the attachment means may be adjacent to opposing ends of the articulatable-dental-arm receiving aperture. Advantageously, the attachment means may be spaced apart from the articulatable-dental-arm receiving aperture Either of these features may allow for the arm to be attached and the articulatable dental arm to be spaced apart and thus one not to obstruct the potential motion of the other.

According to a fifth aspect of the present invention, there is provided a portable-electronic-device support assembly for attachment to an articulatable dental arm, the portable-electronic-device support assembly comprising: a support for a portable electronic device; an articulatable-dental-arm clamp having a first articulatable-dental-arm engagement element and a second articulatable-dental-arm engagement element in use arranged to define an articulatable-dental-arm receiving aperture, fastening means for fastening the first and second articulatable-dental-arm engagement elements to each other so that the first and second articulatable-dental-arm engagement elements engage at least a portion of the in use articulatable dental arm, and support attachment means for attaching the support to the articulatable-dental-arm engagement elements, the support attachment means being spaced apart from the fastening means and comprising a first attachment member at or adjacent to the first engagement element and a second attachment member at or adjacent to the second engagement element, the first attachment member having a boss being at least in part receivable within the second attachment member to prevent separation of the first and second attachment members.

According to a sixth aspect of the present invention there is provided an articulatable dental arm; a portable-electronic-device-support assembly; a portable-electronic-device holder according to a second aspect of the present invention, the portable-electronic-device holder being attached to the a portable-electronic-device-support assembly; and a portable electronic device engaged between the first and second device engagement elements of the portable-electronic-device holder, arranged to display to a dental patient.

An articulatable dental display system, which may here be attached to a dental arm, allows for a portable electronic device to be used to display information or entertainment, whilst being manoeuvrable and supported. This ensures that a dental practitioner does not have to support the portable electronic device. Additionally, the fact that the portable electronic device may be attachable to the dental arm in a clinical environment can prevent or limit the portable electronic device from being removed from the clinical environment where it may become contaminated by an environment exterior to the clinical environment and therefore unsuitable for use in the clinical environment.

Optionally, the articulatable dental arm may be an articulatable dental arm.

Preferably, the clamp is the portable-electronic-device-support assembly according to the fourth or fifth aspects of the present invention, the articulatable dental arm extending through an articulatable-dental-arm receiving aperture of the portable-electronic-device-support assembly arm and the arm attached to the attachment means of the portable-electronic-device-support assembly.

According to a seventh aspect of the present invention, there is provided dental display system comprising: an articulatable-dental-arm clamp, a support and a portable-electronic-device holder; the articulatable-dental-arm clamp having a first articulatable-dental-arm engagement element and a second articulatable-dental-arm engagement element in use arranged to define an articulatable-dental-arm receiving portion, and a support attachment means having an attachment member, the support having a clamp attachment aperture through which the attachment member is extendable; and the portable-electronic-device holder having a multi-part holder body including first and second device engagement elements defining a portable electronic device housing, attachment means for retaining the first and second device engagement elements of the holder body together; the first and/or second device engagement elements defining a viewing aperture to permit physical and/or optical access to the portable electronic device housing, and a mounting element on a back side of the holder body, the portable-electronic-device holder being mountable to the support via the mounting element.

Figure 12:
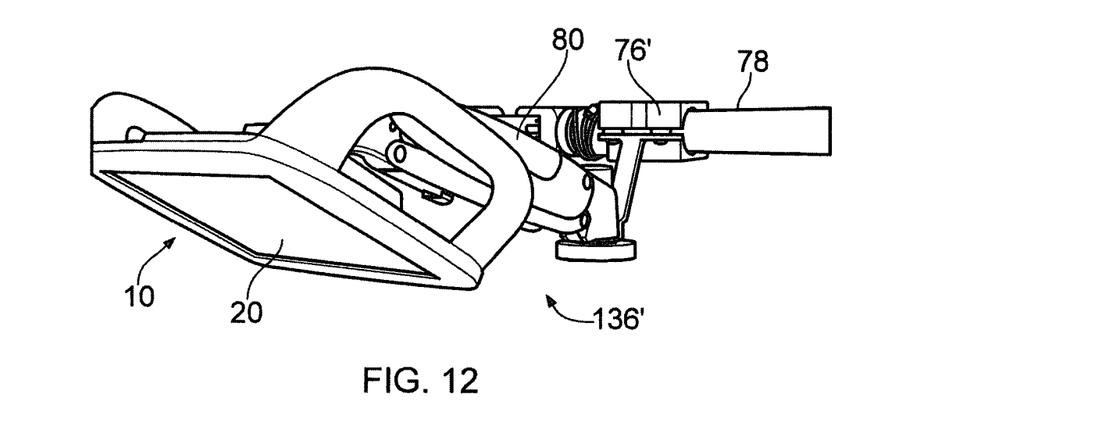

FIG. 12 shows a front perspective representation of a second embodiment of a dental display system, in accordance with the first and seventh aspects of the present invention use in a clinical environment FIGS. 1 to 4 show a portable-electronic-device holder 10 comprising a multi-part holder body 12 having a first device engagement element 14 and a second device engagement element 16. The first device engagement element 14 is for engaging at least part of a front 18 of an in use portable electronic device 20, having a screen 21, whilst the second device engagement element 16 is for engaging at least part of a rear of an in use portable electronic device 20. In this way the first and second device engagement elements 14, 16 may be interengageable in an axis normal to the plane of the screen 21 of the in use portable electronic device 20. The portable-electronic-device holder 10 is here elongate, although it will be appreciated that it may in fact not be elongate.

A longitudinal direction of the holder is defined as being parallel with the elongate extent of the portable-electronic-device holder 10. In this way the longitudinal direction may be considered to be parallel with a long axis of the screen 21 of the in use portable electronic device 20. A lateral direction is perpendicular or substantially perpendicular to the longitudinal direction. In this way the lateral direction may be parallel with a short axis of the screen 21 of the in use portable electronic device 20. The axial direction is orthogonal or substantially orthogonal to the longitudinal and lateral extents and thus may be considered to be parallel to the depth of the portable-electronic-device holder 10 and/or may be parallel to an axis normal to the screen 21 of the in use portable electronic device 20.

Whilst described and shown in this way it will be appreciated that the use of the first and second device engagement elements may in fact be reversed such that the first device engagement element is for engaging the rear of an in use portable electronic device whilst the second device engagement element is for engaging the front of an in use portable electronic device. Additionally, it will be appreciated that the first and second device engagement elements may be for engaging different parts of the in use portable electronic device, for example one of the first or second device engagement elements may be in use for engaging atop of the portable electronic device and the other of the first or second device engagement element may be for engaging a bottom of the portable electronic device. Thus, the first and second device engagement elements may be laterally interengageable. Alternatively, each of the first and second device engagement elements may be for engaging opposing sides of the portable electronic device. Thus, the first and second device engagement elements may be longitudinally interengageable.

The first device engagement element 14 preferably has a rectangular or substantially rectangular axial cross section with rounded corners. A perimeter portion 22 of the first device engagement element 14 here extends at least in part axially beyond an inner portion 24 of the first device engagement element 14 to form a first part of a portable electronic device housing 26 or device mounting region and here part of a device recess. In this way the first device engagement element 14 may be considered to be non-planar or substantially non-planar. The perimeter portion 22 is preferably curvate thus an interior surface 28 of the perimeter portion 22 may be considered to be concave whilst an exterior surface 30 of the perimeter portion 22 may be convex. The interior and exterior surfaces may meet at a first joining rim 32, which may be considered to be an edge of the, at least in part, axially extending perimeter portion 22 of the of the first device engagement element 14.

Whilst described and shown as being rectangular or substantially rectangular, it will be appreciated that the first device engagement element may alternatively have an elliptical, square, circular or other polygonal or curvate axial cross-section. Whilst described as a recess, the housing may here be a flame or support structure and may not surround the device and may, for example, only engage the device at discontinuous points, for example at the corners or along the edges.

Figure 1:
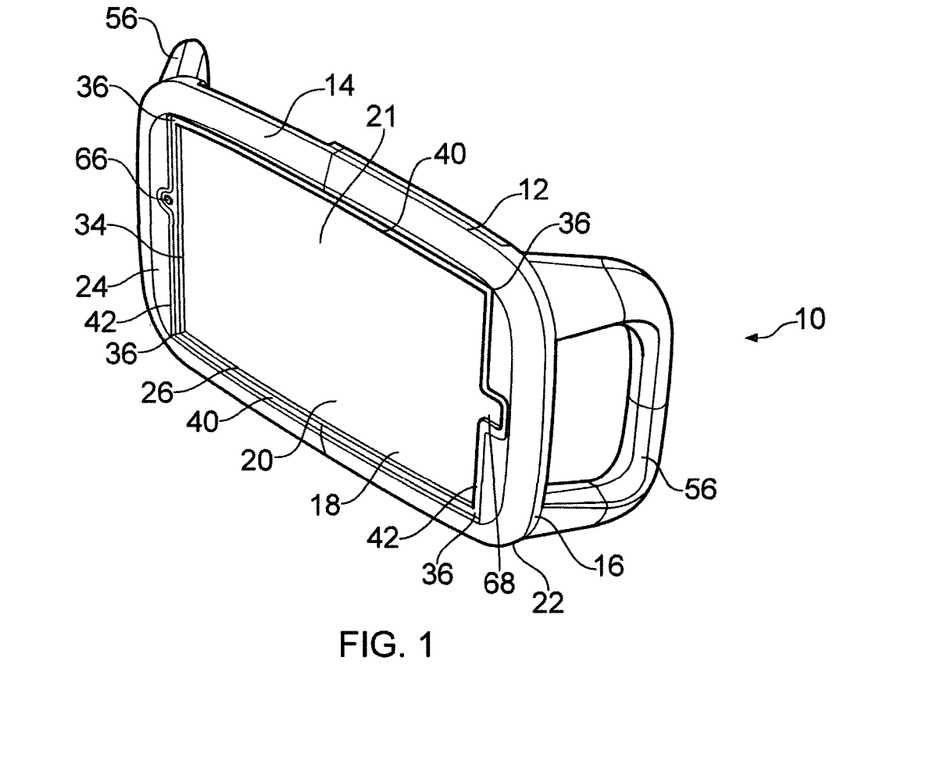
FIG. 1 shows a front perspective view of a portable-electronic-device holder, in accordance with a second and third aspect of the present invention, of a dental display system in accordance with the first, sixth and seventh aspects of the present invention, with the position of an in use portable electronic device indicated.
Figure 4:
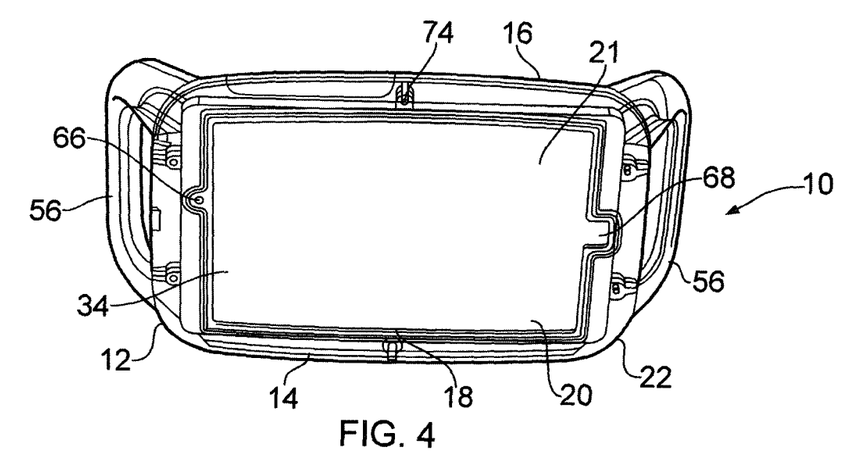
FIG. 4 shows a front view of the portable electronic device holder of FIG. 1 with the position of the in use portable electronic device indicated in the device recess.

The holder 10 has a viewing aperture 34 to permit user manual and/or optical access to the portable electronic device housing 26. The viewing aperture 34 preferably extends through the first device engagement element 14. Here the viewing aperture 34 has a substantially rectangular axial cross section. Thus, the viewing aperture 34 is at least in part non-rectangular and has a non-rectangular perimeter to define at least one retaining portion 36 so as to increase user and/or manual access to a screen 21 of the in use portable electronic device 20 whilst still holding the device. Preferably at least one edge of the viewing aperture 34 is non-linear. The or each retaining portion 36 may be considered to be a corner of the viewing aperture 34. At least one edge of the viewing aperture 34 may be non-linear. Each lateral edge 40 of the viewing aperture 34 which extends substantially parallel the longitudinal direction may be curvate and preferably arcuate such that it at least in part extends laterally away from a centre of the viewing aperture 34. Each lateral edge may be non-parallel with respect to each other.

Therefore, a lateral extent of the viewing aperture 34 at a laterally extending centre line may be greater than the lateral extent of one or both longitudinal edges 42. Thus, the short edge 42 of the viewing aperture is shorter than a laterally extending centre line. In this way one or both of the longitudinal edges 42 may be considered to extend outwardly or away from a longitudinal centre line of the viewing aperture 34 and/or the viewing aperture 34. This arrangement may alternatively be considered to have at least one, and preferably each, corner, corner portion or retaining portion 36 extending inwardly or towards a longitudinal centre line of the viewing aperture 34 and/or the viewing aperture 34. A lateral dimension or length of the longitudinal edge 42 may for example be in the range of 140 mm to 180 mm and may more preferably be in the range of 150 mm to 170 mm whilst a lateral dimension or length of a lateral centre line may be in the range of 150 mm to 190 mm and may more preferably be in the range of 160 mm to 180 mm. The lateral centre line may be considered to be of the range 5 mm to 20 mm greater than the lateral extent of the or each longitudinal edge 42.

Additionally or alternatively, a longitudinal extent of the viewing aperture 34 along a longitudinally extending centre line may be greater than the longitudinal extent of one or both of the lateral edges 40. Thus, the long edge 40 of the viewing aperture is shorter than a longitudinally extending centre line. In this way one or both of the lateral edges 40 may be considered to extend outwardly or away from a lateral centre line of the viewing aperture 34. This arrangement may alternatively be considered to have at least one, and preferably each, corner, corner portion or retaining portion 36 extending inwardly or towards a lateral centre line of the viewing aperture 34. A longitudinal dimension of the lateral edge 40 may for example be in the range of 210 mm to 250 mm and may more preferably be in the range of 220 mm to 240 mm whilst a longitudinal dimension of a longitudinal centre line may be in the range of 220 mm to 260 mm and may more preferably be in the range of 230 mm to 250 mm. The longitudinal centre line may be considered to be of the range 5 mm to 20 mm greater than the longitudinal extent of the or each lateral edge 40.

Whilst the viewing aperture 34 is described and shown as having both lateral edges 40 as being non-linear, it will be appreciated that one of the lateral edges 40 may be non-linear and the other may be linear or substantially linear. Additionally, it will be appreciated that whilst the longitudinal edge 42 of the viewing aperture 34 of the aperture may here be shown as being linear or substantially linear, the longitudinal edge 42 of the viewing aperture 34 of the aperture may in fact be curvate and/or arcuate and may extend at least in part away from a centre of the viewing aperture 34. Whilst described as being arcuate and non-linear, it will be appreciated that the edges of the viewing aperture may in fact be linear and still extend at least in part away from the centre of the viewing aperture. In this way at least one of the edges may be stepped. For example, the long edge may extend in a longitudinal direction along an extent of each corner portion and may then extend in a lateral direction away from the centre of viewing aperture, adjacent to each corner portion, before again extending in a longitudinal direction.

Figure 2:
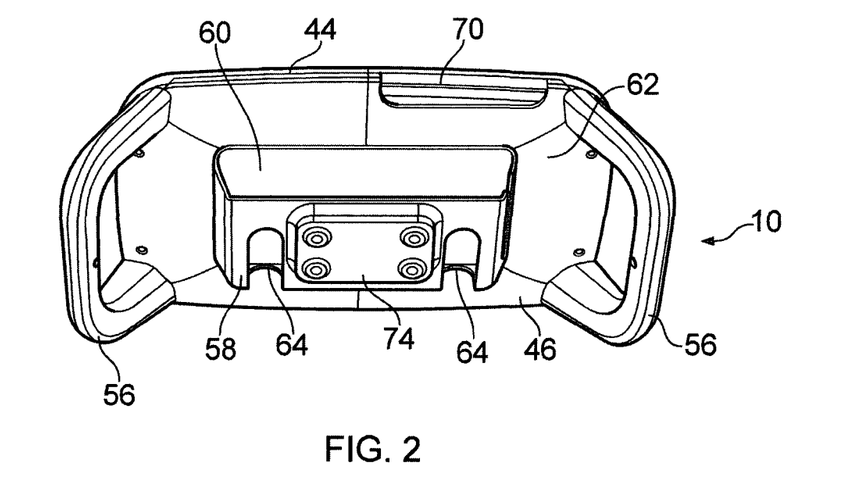
FIG. 2 shows a rear perspective view of the portable-electronic-device holder of FIG. 1.
Figure 3:
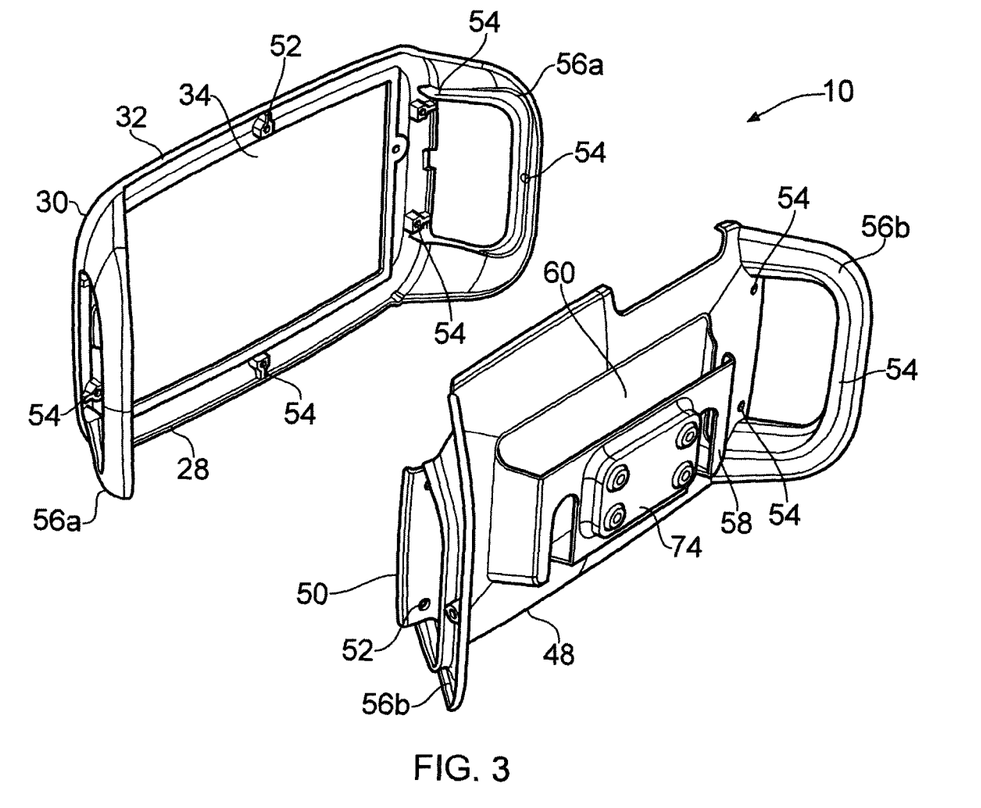
FIG. 3 shows an exploded rear perspective view of the portable-electronic-device of FIG. 1.

The second device engagement element 16 is preferably similarly formed to the first device engagement element 14, with the exception that the second device engagement element 16 does not here have the viewing aperture 34 extending axially therethrough. In this way the second device engagement element 16 may preferably have a rectangular or substantially rectangular axial cross section with rounded corners. A perimeter portion 44 of the second device engagement element 16 extends at least in part axially beyond an inner portion 46 to form a second part of a portable electronic device housing 26 and here part of the device recess 26. Thus, the second device engagement element 16 can be considered to be non-planar or substantially non-planar. The perimeter portion 44 is preferably curvate so an interior surface of the perimeter portion 44 is concave whilst an exterior surface 48 of the perimeter portion 44 is convex. The interior and exterior surfaces may meet at a second joining rim 50, which may be considered to be an edge of the, at least in part, axially extending perimeter portion 44 of the of the second device engagement element 16.

Whilst described and shown as being rectangular or substantially rectangular, it will be appreciated that the second device engagement element may alternatively have an elliptical, square, circular or other polygonal or curvate axial cross-section, The portable-electronic-device holder 10 additionally comprises attachment means 52 to attach the device engagement elements 14, 16 to each other so that they engage the in use portable electronic device 20. The attachment means 52 preferably comprises at least one fastener receiving aperture 54. Here there may be at least one fastener receiving aperture 54 which extends through an axial extent of each device engagement element with the or each fastener receiving aperture 54 through the first device engagement element 14 being aligned with the or each fastener receiving aperture 54 through the second device engagement element 16. This is so that a fastener may be insertable through corresponding apertures 54 to attach the first and second device engagement elements 14, 16 together. Here there are preferably six fastener receiving apertures 54 through each device engagement element 14, 16. Whilst the attachment means is described as being fastener receiving apertures to receive a fastener, it will be appreciated that the attachment means may in fact take other forms. For example, the attachment means may be an interference fit, a clamp, an adhesive or other attachment means.

The first and second device engagement elements 14, 16 are interengageable, preferably so that together they form the device recess 26. This may be done via the first and second joining rims 32, 50 inter-engaging. The first part of the device recess 26 may thereby be combined with the second part of the device recess 26 so as to form the device recess 26.

The device recess 26 is sized so as to receive the portable electronic device 20, in this way it may have dimensions in the range of 220 mm to 260 mm in a longitudinal dimension or length, 150 mm to 190 mm in a lateral dimension or width and 2.5 mm to 25 mm in an axial dimension or depth.

Whilst the first and second device engagement elements are described as each having a part of the device recess, it will be appreciated that one of the first and second device engagement elements may be planar or substantially planar and the other of the first and second device engagement element may have the entire or substantially the entire device recess.

The portable-electronic-device holder 10 may further comprise at least one handle 56. The or each handle 56 preferably extends at an angle away from a plane of the viewing aperture 34, such that the or each handle 56 extends both longitudinally and axially away from the viewing aperture 34. This angle may preferably be between 5 and 85 degrees, more preferably between 30 and 60 degrees and is here substantially 45 degrees. However, it will be appreciated that the or each handle 56 may in fact extend only axially or laterally away from the viewing aperture 34 or may in fact extend axially or longitudinally towards the viewing aperture 34. Here there are two handles 56, each handle 56 being positioned at a different longitudinal end of the holder body 12 from each other such that the handles 56 are spaced apart. Each handle 56 are preferably at distal ends of the first and second device engagement elements 14, 16 and is preferably curvate and/or arcuate and is here U-shaped. Whilst two handles are described in it appreciated that there may be more than two handles or only one handle.

Each handle 56 is preferably formed from a first part 56*a* and a second part 56*b*. The first and second parts 56*a*, 56*b* of the handle 56 are also U-shaped or substantially U-shaped, each part having two ends with the two ends of the first part 56*a* each engaging the first device engagement element 14 at spaced apart positions. Similarly, the two ends of the second part 56*b* may each engage the second device engagement element 16 at spaced apart positions. Whilst described as having ends, the first part 56*a* is here unitarily formed with the first device engagement element 14 and the second part 56*b* is unitarily formed with the second device engagement element 16. Thus, when the first and second device engagement elements 14, 16 are attached together the first and second parts 56*a*, 56*b* of each handle 56 are engaged together. Each handle 56 has a fastener receiving aperture 54 to ensure the two parts 56*a*, 56*b* are attachable, although it will be appreciated this may not be necessary and the parts of each handle 56 may be attached by virtue of being unitarily formed with the first and second device engagement elements 14, 16.

Whilst described as being U-shaped or substantially U-shaped, it will be appreciated that the handles may in fact not be U-shaped and may only have one end engaging the holder body and/or may be linear or substantially linear. Additionally, it will be appreciated that a handle may not be necessary to the working of the device. Whilst the first and second handles are described as being unitarily formed with the first and second device engagement elements, it will be appreciated that, for ease of manufacture, either or both handles may in fact be separately formed from the engagement elements.

The portable-electronic-device holder 10 preferably further comprises a battery receiver 58 for receiving a battery to power the portable electronic device 20. The battery receiver 58 may here be a slot, bracket, frame or recess and is here a battery recess having a slot-shaped opening 60. The battery receiver 58 is here positioned at or on a rear or back of the holder body 12 and may therefore be attachable to, engagable with or fixable to the second device engagement element 16 and preferably a rear wall 62 of the second device engagement element 16. The battery recess 58 includes at least one battery access opening 64 which may extend axially and laterally through a rear wall of battery recess 58. Here there are two battery access openings 64 and each battery access opening 64 may allow a user to manually access an in use battery which may be within the battery recess 58. The axial extent of the battery access opening 64 provides access to the battery recess 58 whilst the lateral extent enables the in use battery to be manipulated out of the recess 58. The battery recess 58 preferably has electrical inductors or conductors to interconnect at least part of the battery recess 58 with the portable electronic device housing or device recess 26. The conductors may take the form of a separate power cable which is connectable to a power inlet of the portable electronic device 20. Alternatively, the conductors may be a terminal connector which connects through the holder body 12. In this way the electrical inductors may interconnect an in-use battery with the in use portable electronic device 20. Although not shown, the battery receiver may have an aperture for allowing access to a battery power button. Additionally, the battery receiver and/or the second device engagement means may have cable tying means, such as hook-and-loop-fastener-strap receiving apertures. Whilst the battery receiver is described as being on a rear of the holder, it will be appreciated that the battery receiver may be in one of the handles or each handle, having conductors to electrically connect a battery received in the handle to the power inlet of the portable electronic device.

Whilst a battery recess is provided, it will be appreciated that a battery recess may not be necessary and the holder may instead have electrical connectivity, such as a socket, for connection of a power cable.

The portable-electronic-device holder 10 preferably further comprises at least one further aperture 66 or view port which may extend through at least part of the first and/or second device engagement element 14, 16 for allowing optical access for a camera of the in use portable electronic device 20. Here the second opening extends through the first device engagement element 14 and is unitarily formed with the viewing aperture 34, although it will be appreciated that the further aperture 66 may in fact be distinct and/or spaced apart from the viewing aperture 34. The further aperture 66 is at or adjacent to a longitudinal edge 42 of the viewing aperture 34, although it will be appreciated that it may in fact be positioned elsewhere with respect to the viewing aperture 34, for example at or adjacent to a lateral edge 40.

The portable-electronic-device holder 10 preferably further comprises a device-button engagement element 68 for enabling a user to activate a button on the portable electronic device 20, the device-button engagement element 68 being a further aperture or formed from pliable material. The device-button engagement element 68 is here a third aperture and extends through the first device engagement element 14, being unitarily formed with the viewing aperture 34. It will be appreciated that the third aperture may in fact be distinct and/or spaced apart from the viewing aperture and may extend through the second device engagement element.

The portable-electronic-device holder 10 may additionally comprise at least one further access aperture 70. Here, there is a further access aperture 70 which extends through an upper extent of the perimeter portion 22 of the second device engagement element 16 and thus allows for the user to interact with a portion of a side of the in use device. This access may allow for the user to access a data storage device or to connect a power cable.

The portable-electronic-device holder 10 further comprise an articulatable-arm mounting element 72. The articulatable-arm mounting element 72 may be for in use mounting, interconnecting and/or suspending the holder 10 from an arm or an articulatable arm, for example. The mounting element may be a projection or a protrusion from a back or rear side of the holder body. The articulatable-arm mounting element may have thither attachment means which may comprise fastener receiving apertures, at least part of an interference fit or magnetic element. The mounting element 72 is preferably positioned on the rear wall of the battery recess 58 and below the slot shaped opening 60 of the battery recess 58. Additionally, the battery access opening 64 are either side of the mounting element 72. This is such that, when the portable-electronic-device holder 10 is mounted via the mounting element 72, the opening 60 and the access openings 64 of the battery recess 58 are accessible. In this way, in use, should the battery require replacement, the discharged battery can be quickly and conveniently replaced with a new battery without dismounting the portable-electronic-device holder 10 first. This provides minimal disruption, should the battery require changing during dental examination.

In use, a portable electronic device 20 is provided. The first device engagement element 14 is positioned so that it engages at least part of a front 18 of the portable electronic device 20. The perimeter portion 22 of the first device engagement element 14 engages at least part of but preferably not the whole of a screen border 74 of the portable electronic device 20. In this way at least part of the screen border 74 may be visible or exposed through the viewing aperture 34. The further aperture 66 is aligned with any camera of the portable electronic device 20 and the device-button engagement element 68 is aligned with a button of the portable electronic device 20.

The second device engagement element 16 is positioned so that it engages a rear surface of the portable electronic device 20. The third aperture 68 may be aligned with a data storage device input or the power input of the portable electronic device 20. The first and second joining rims 32, 50 of the first and second device engagement elements 14, 16 may therefore interengage. In this way the portable electronic device 20 may be held, supported, secured or engaged in the portable electronic device housing 26 which is here a device recess 26 and is thus within the multi-part holder body 12.

With the first and second device engagement elements 14, 16 inter-engaging, the first and second part of each handle 56 are also inter-engaged.

The attachment means 52 are then used to secure the first and second device engagement elements 14, 16 together, which here takes the form of inserting fasteners through each of the fastener receiving apertures 54. The fasteners may be nut and bolts, screws or studs. The portable electronic device 20 is therefore securely held within the device housing 26 which is here a device recess.

If desired, a battery can then be inserted into the battery receiver 58 and the battery is connected to the electrical inductors which extend from the battery recess 58 to the device recess 26, which are there connected to the power input of the portable electronic device 20. If the battery is required to be removed from the battery receiver 58 a user can place their finger through the or each battery engagement slot to engage the battery and then push in the direction of the opening of the battery receiver 58 so that the battery projects from the battery receiver 58.

The portable-electronic-device holder 10 may then be attached or fastened to an articulatable arm, which is preferably an articulatable dental arm, via the articulatable-arm mounting element 72.

Whilst the holder is described as having multiple parts, it will be appreciated that the holder and/or the first and second device engagement elements can in fact be unitarily formed as a one piece. The holder could be formed from flexible or pliant material so that the portable electronic device may be inserted through the viewing aperture and then engaged. Alternatively or additionally, the holder and/or the first and second device engagement elements may be formed as a one piece and an insertion slot or recess may be present in the holder to enable the insertion of a device. A stopper may be positioned over or in the insertion slot or recess to prevent removal of the device.

Figure 5:
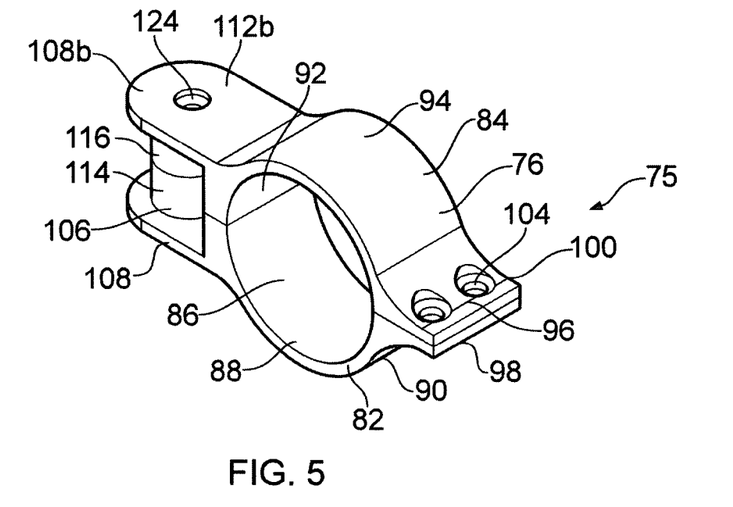
FIG. 5 shows a perspective representation of a first embodiment of a articulatable-dental-arm clamp, in accordance with the fifth aspect of the present invention, of a dental display system in accordance with the first and seventh aspects of the present invention.
Figure 6:
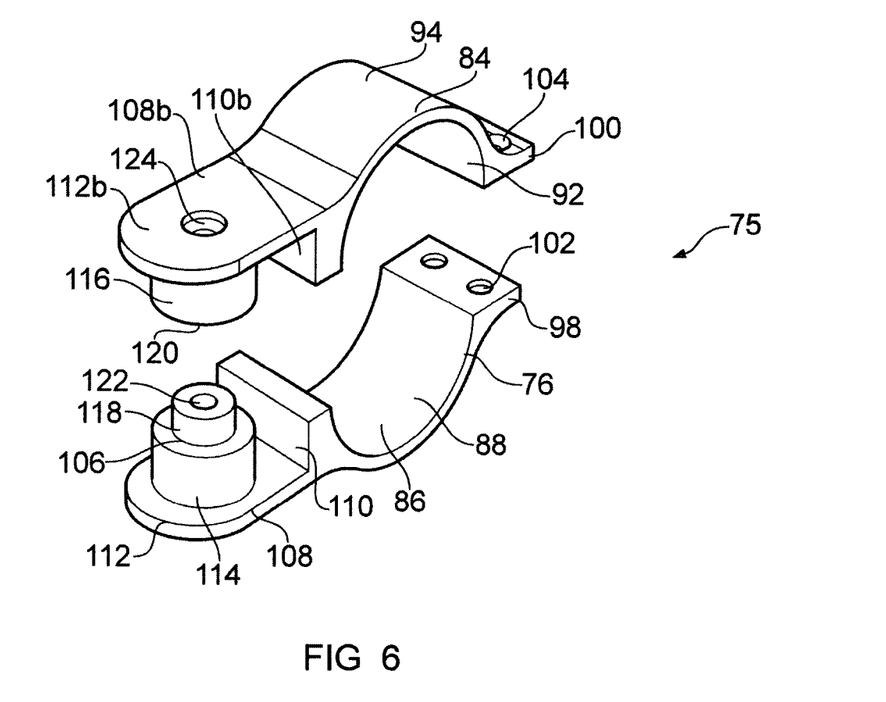
FIG. 6 shows a perspective representation, rotated from the view of FIG. 5, of the articulatable-dental-arm clamp of FIG. 5 with the first and second articulatable-dental-arm engagement elements spaced apart.

FIGS. 5 and 6 show a first embodiment of a portable-electronic-device-support assembly 75 for connecting an articulatable dental arm 78 to a portable electronic device 20. The portable-electronic-device-support assembly 75 comprising an articulatable-dental-arm clamp 76 and a support 80 for a portable electronic device, which may here be an arm which may also be articulatable. The articulatable-dental-arm clamp 76 includes a first articulatable-dental-arm engagement element 82 and a second articulatable-dental-arm engagement element 84. The first and second articulatable-dental-arm engagement elements 82, 84 are arrangeable to define an articulatable-dental-arm receiving aperture 86.

To this end, the first articulatable-dental-arm engagement element 82 has a first interior engagement surface 88 which here has a semi-circular or substantially semi-circular axial cross section and a first exterior surface 90 which also has a semi-circular or substantially semi-circular axial cross section. In this way the first articulatable-dental-arm engagement element 82 is or is substantially a half tube.

The second articulatable-dental-arm engagement element 84 may similarly have a second interior engagement surface 92 and a second exterior surface 94 which may be similarly shaped as the surfaces 88, 90 of the first articulatable-dental-arm engagement element 82. In this way the second articulatable-dental-arm engagement element 84 is or is substantially also a half tube.

Whilst described in this way, it will be appreciated that each articulatable-dental-arm engagement element may in fact have an axial cross-section which may not be semi-circular and for example may in fact be rectangular, elliptical, square or triangular. Additionally, it will be appreciated that the first and second articulatable-dental-arm engagement elements 82, 84 may not each be or be substantially the shape of a half tube and each may in fact have the shape of more than a half or less than a half of a tube, provided that a suitable support member receiving aperture 86 can be formed, noting that the support member receiving aperture 86 need not necessarily be a complete annulus.

The first and second articulatable-dental-arm engagement elements 82, 84 are arranged or interengaged so that the articulatable dental arm 78 receiving aperture may be circular in cross section.

The articulatable-dental-arm clamp 76 further comprises fastening means 96 for fastening the first and second articulatable-dental-arm engagement elements 82, 84 to each other so that the first and second articulatable-dental-arm engagement elements 82, 84 engage at least a portion of the in use articulatable dental arm 78.

The fastening means 96 firstly comprises a first fastening projection 98 which extends radially outwardly or substantially radially outwardly from a circumferential end of the first interior engagement surface 88 and the first exterior surface 90 of the first articulatable-dental-arm engagement element 82. The fastening means 96 further comprises a second fastening projection 100 which may be arranged similarly or the same relative to the second interior engagement surface 92 and the second exterior surface 94 as the first fastening projection 98 is. When the first and second articulatable-dental-arm engagement elements 82, 84 are arranged or interengaged the first and second fastening projections 98, 100 are also interengaged or substantially interengaged.

The fastening means 96 preferably additionally comprises at least one first fastener receiving aperture 102 which may extend through a circumferential extent of the first fastening projection 98 and at least one second fastener receiving aperture 104 which may extend through a circumferential extent of the second fastening projection 100. The or each first and second fastener receiving apertures 102, 104 may be aligned or coaxial such that a fastener may be inserted through corresponding first and second fastener receiving apertures 102, 104. Here there are two fastener receiving apertures 102, 104 which extend through each fastening projection 98, 100.

Whilst the fastening means 96 is described as comprising first and second fastening projections 98, 100 it will be appreciated that these may not be necessary to fasten the first and second articulatable-dental-arm engagement elements 82, 84 and the fastener receiving apertures may instead extend through at least part of a circumferential extent of the first and/or second articulatable-dental-arm engagement elements directly. Additionally, whilst described as fastening means, it will be appreciated that the first and second articulatable-dental-arm engagement elements may in fact be attached to each other by adhesive or an interference fit.

The articulatable-dental-arm clamp 76 further comprises support attachment means 106 for attaching the support 80, which is here an arm, to the portable electronic device to the articulatable-dental-arm engagement elements 82, 84, the support attachment means 106 being spaced apart from the fastening means 96. The support attachment means 106 is positioned at or adjacent to an opposing circumferential end of the first and second articulatable dental arm engagement elements 82, 84 to the fastening means 96. Thus, the attachment means 106 and the fastening means 96 may be spaced apart by at least the diameter of the articulatable-dental-arm receiving aperture 86. However, it will be appreciated that the attachment means may, for example be positioned at or adjacent to the fastening means or at or adjacent to a centre of the exterior surface of the first or second articulatable-dental-arm engagement element.

The attachment means 106 comprises a first bracket 108 which may be attached to a first articulatable-dental-arm engagement element 82. The first bracket 108 comprises a first bracket support part 110 which is engageable with, at or adjacent to the first articulatable-dental-arm engagement element 82. The first bracket 108 further comprises a first bracket projecting part 112 which extends away from the first articulatable-dental-arm engagement element 82 in a plane parallel or substantially parallel to the first fastening projection 98. The first bracket projecting part 112 is here vertically spaced apart from the first fastening projection 98.

The attachment means 106 further comprises a second bracket 108b which may have a second bracket support part 110b and a second bracket projecting part 112b which may be similarly arranged with respect to the second articulatable-dental-arm engagement element 84 as the first bracket 108 is to the first articulatable-dental-arm engagement element 82.

Whilst described as having a first and second bracket it will be appreciated that the attachment means may in fact not have first and second brackets.

The attachment means 106 comprises a first attachment member 114 at or adjacent to the first articulatable-dental-arm engagement element 82 and preferably a second attachment member 116 at or adjacent to second articulatable-dental-arm engagement element 84. Here the first attachment member 114 is seated on the first bracket projecting part 112 of the first bracket 108 and the second attachment member 116 is seated on the second bracket projecting part 112b. In this way the first and second attachment member 114, 116 are spaced apart from the articulatable-dental-arm receiving aperture 86. The first and second attachment member 114, 116 are preferably cylindrical in shape and extend in a direction perpendicular or substantially perpendicular to the projecting part they are seated on. Although described as cylindrical it will be appreciated that first and second attachment member may in fact be cuboidal or another shape.

The first attachment member 114 has a boss 118 which is here a cylindrical protrusion having a smaller diameter than the remainder of the first attachment member 114. The second attachment member 116 has a boss receiving opening 120 which is complementary sized to the boss 118. The boss 118 is at least in part receivable within second attachment member 116 and is here receivable within the boss receiving opening 120 of the second attachment member 116. This can prevent in use separation of the first and second attachment member 114, 116.

A first attachment fastener receiving aperture 122 may extend through the first attachment member 114 and a second attachment fastener receiving aperture 124 may extend through the second attachment member 116. The first and second attachment fastener receiving apertures 122, 124 may be positionable such that they are coaxial.

The attachment means 106 may further comprise an engagement element for engageably attaching the support for a portable electronic device 80 to the first and/or second attachment members 114, 116. The engagement element is preferably a grub screw.

Figure 7:
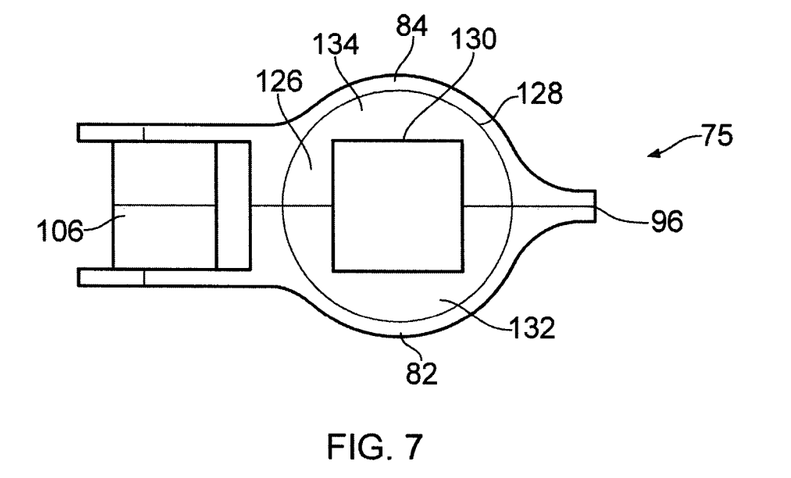
FIG. 7 shows a front representation of the articulatable-dental-arm clamp of FIG. 5 with an articulatable dental arm adaptor positioned in the articulatable-dental-arm receiving aperture.

Whilst described separately, it will be appreciated that any or all of the first articulatable-dental-arm engagement element 82, the first fastening projection 98, the first bracket 108 and the first attachment member 114 may be unitarily formed together as a one piece. Similarly, any or all of the second articulatable-dental-arm engagement element 84, the second fastening projection 100, the second bracket and the second attachment member 116 may be unitarily formed together as a one piece FIG. 7 shows the embodiment of the portable-electronic-device-support assembly 75 having an articulatable dental arm adaptor 126 inserted into the articulatable-dental-arm receiving aperture 86 of the articulatable-dental-arm clamp 76. The articulatable dental arm adaptor 126 here has an exterior surface 128 which is complementary with the articulatable-dental-arm receiving aperture 86 an interior surface 130 for engaging the articulatable dental arm 78. The exterior surface 128 therefore here has a circular cross-section.

The articulatable dental arm adaptor 126 is formed from two parts, a first adaptor part 132 engageable with the first articulatable-dental-arm engagement element 82 and a second adaptor part 134 engageable with the second articulatable-dental-arm engagement element 84. It will be appreciated that the articulatable dental arm adaptor may be unitarily formed as a one piece or may be formed from more than two parts.

The interior surface 130 here has a square radial cross-section, although it will be appreciated that it may in fact have a circular, elliptical or triangular lateral cross section.

In use, the first and second articulatable-dental-arm engagement elements 82, 84 are positioned to engage either side of a portion of the articulatable dental arm 78. In this way the first and second articulatable-dental-arm engagement elements 82, 84 are interengaged so that the articulatable dental arm 78 is received within the articulatable-dental-arm receiving aperture 86. The first and second fastening projections 98, 100 are also interengaged and their associated fastener receiving apertures 102, 104 are coaxially aligned. A fastener, such as bolt and nut, a stud or a screw may be inserted through the fastener receiving apertures 54 so as to fasten the first and second articulatable-dental-arm engagement elements 82, 84 together.

At the same time, the first or second attachment members 114, 116 may be positioned to project through at least part of the support 80, and may extend through an aperture in the support 80. The boss 118 of the first attachment member 114 may then be received within the boss receiving opening 120 of the second attachment member 116. A fastener may then be inserted through the first and second attachment fastener receiving apertures 102, 104. Whilst securing the attachment means 106, it will be appreciated that this fastener may also fasten the clamp 76 to the support 80

In this way the support 80 may be attached to an articulatable dental arm 78. The weight of the support 80 may impart a moment or a force to the attachment means 106 to tend to cause the first and second attachment members 114, 116 to separate in an off-axial or radial direction. A side surface of the boss 118 engaging with the side surface of the boss receiving opening 120 may inhibit, limit or prevent such off-axial separation from occurring.

Figure 8:
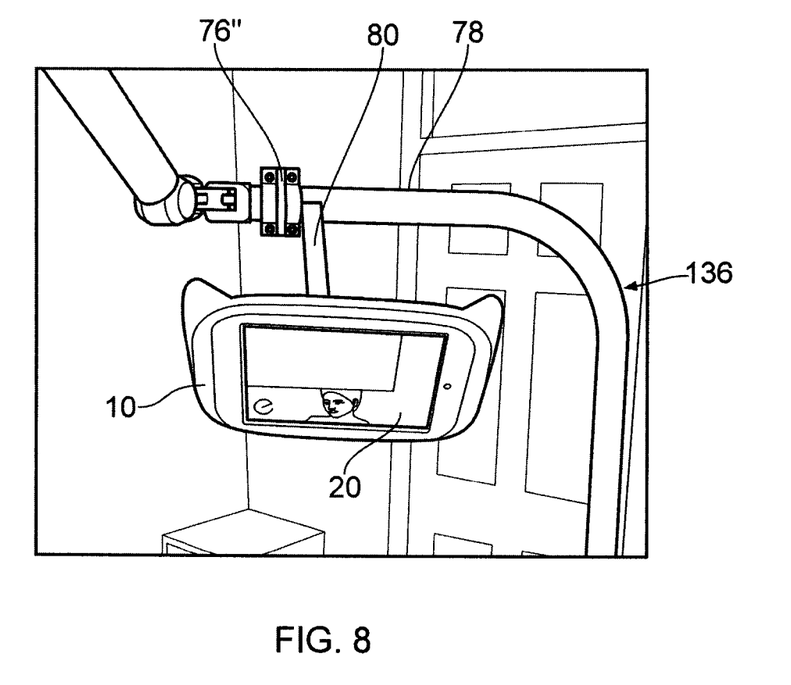
FIG. 8 shows a front perspective representation of a first embodiment of a dental display system, in accordance with the first and seventh aspects of the present invention use in a clinical environment.

FIG. 8 shows a first embodiment of an articulatable dental display system 136 comprising an articulatable dental arm 78, clamp 76", a support 80 for the portable electronic device, which may here be an arm which may or may not be articulatable, a portable-electronic-device holder 10 and a portable electronic device 20. The support 80 may preferably have an aperture through which the or each attachment member 114, 116 may extend to enable attachment therebetween. Additionally, the support 80 may have means for attachment to the mounting element 72. The support is preferably pivotably or rotatably attached to the or each attachment member and may additionally be pivotably or rotatably attached to the portable electronic device holder 10.

The articulatable dental arm 78 is here a movable dental arm, pole, dental light support or boom for use in a dental surgery or clinic, and although is described as being articulatable may not be articulatable. The articulatable dental arm 78 extends through an articulatable-dental-arm receiving aperture 86 of the clamp 76". The further arm, which again may be articulatable, is attached to the clamp 76". The portable-electronic-device holder 10 is attached to the further arm by the articulatable-arm mounting element 72. The portable electronic device 20 is engaged between the first and second device engagement elements 14, 16 of the portable-electronic-device holder 10.

The clamp may here be an articulatable-dental-arm clamp 76 and thus the arm may be attached to the attachment means 106 of the articulatable-dental-arm clamp 76.

The portable electronic device 20 is therefore engaged within the holder 10 and attached to the articulatable dental arm 78, which may be an articulatable dental arm, via the clamp 76. Therefore, the portable electronic device is able to be moved by virtue of being connected to the articulatable arm 78 which may be movable. The portable electronic device is also movable by virtue of being connected to via the clamp 76, the support 80 for the portable electronic device being movable around the attachment means 106 of the clamp. The portable electronic device is therefore in use positionable in front of a patient, who may be seated or supine, and/or in front of a head rest of the dental chair.

Figure 9:
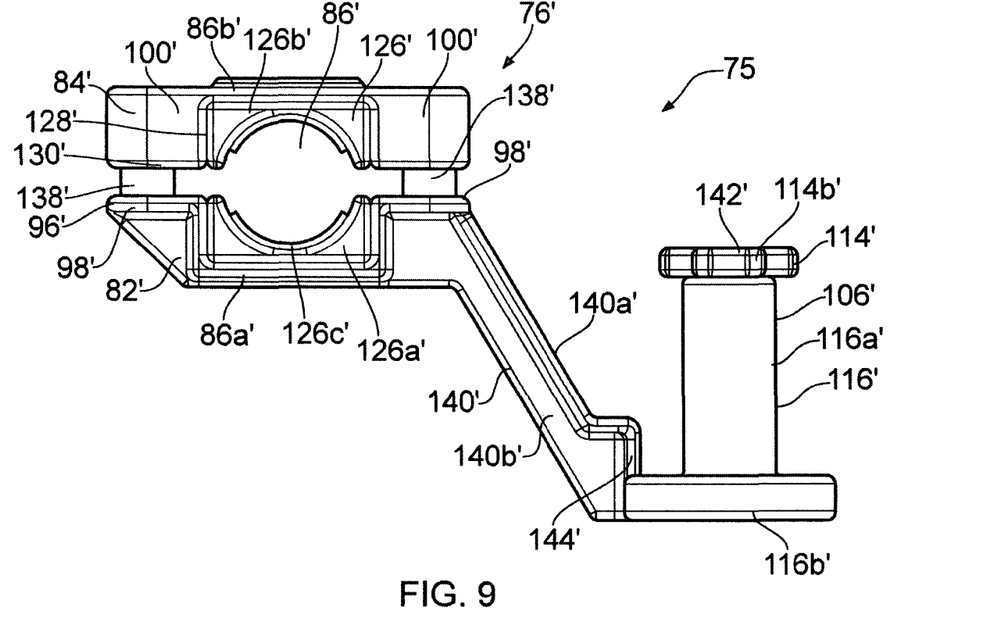
FIG. 9 shows a front representation of a second embodiment of a articulatable-dental-arm clamp, in accordance with the fourth aspect of the present invention, of a dental display system in accordance with the first and seventh aspects of the present invention.
Figure 10:
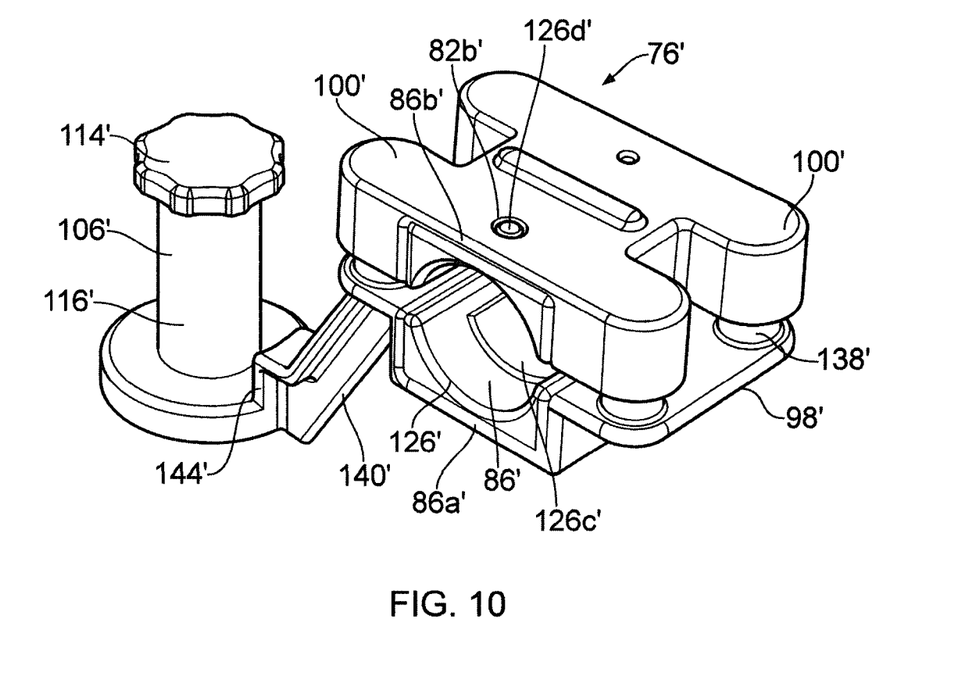
FIG. 10 shows an upper perspective representation of the articulatable-dental-arm clamp of FIG. 9.
Figure 11:
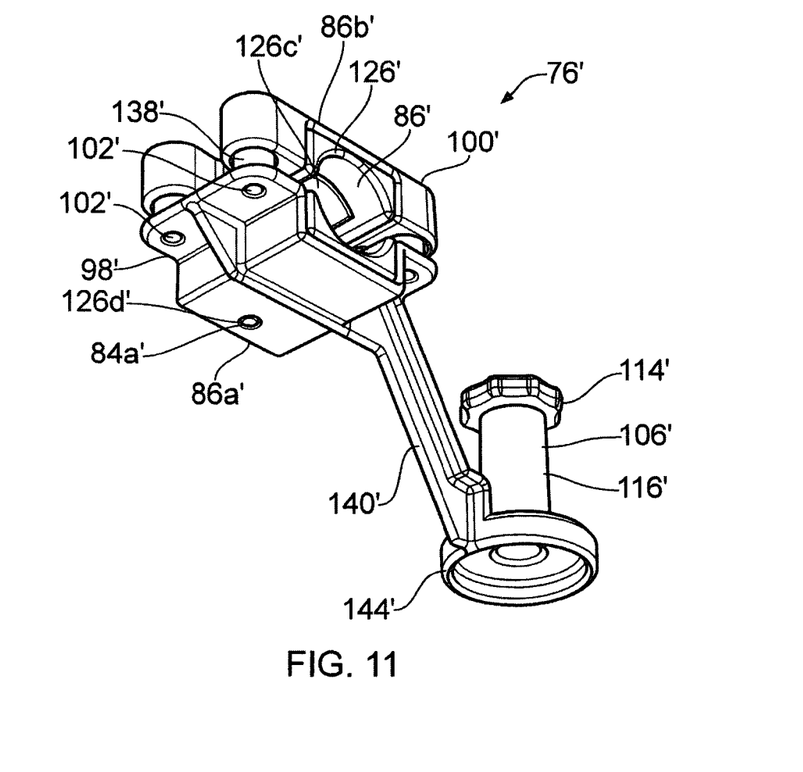
FIG. 11 shows a lower perspective representation of the articulatable-dental-arm clamp of FIG. 9.

Referring to FIGS. 9 to 11, there is shown a second embodiment of a articulatable-dental-arm clamp 76' of a portable-electronic-device-support assembly 75'. Elements which are similar or identical to those of the preceding portable-electronic-device-support assembly 75' are denoted by the same or similar reference number with added where necessary, and thither detailed description is omitted.

The clamp 76' comprises a first articulatable-dental-arm engagement element 82' and a second articulatable-dental-arm engagement element 84'. The two articulatable-dental-arm engagement elements 82', 84' define an articulatable-dental-arm receiving portion 86', having a first part 86a' defined by the first articulatable-dental-arm engagement element 82' and a second part 86b' defined by the second articulatable-dental-arm engagement element 84'.

The articulatable-dental-arm receiving portion 86' is here preferably square, rectangular or substantially square or rectangular in profile. The first and second parts 86a', 86b' are preferably spaced apart from each other, therefore the articulatable-dental-arm receiving portion 86' does not have a continuous side wall. The articulatable-dental-arm receiving portion 86' may therefore be discontinuous. The first and second parts 86a', 86b' here each have an angular U-shaped profile such that they may be considered to have the form of a channel.

The clamp 76' preferably further includes an articulatable-dental-arm adaptor 126' insertable into the articulatable-dental-arm receiving portion 86', the articulatable-dental-arm adaptor 126' having an exterior surface 128' complementary with the articulatable-dental-arm receiving portion 86' and an interior surface 130' for engaging the articulatable dental arm 78. Here the adaptor 126' has two spaced apart parts 126a', 126b', corresponding to the two parts 86a', 86b' of the articulatable-dental-arm receiving portion 86'. The interior surface 130 is circular or substantially circular, so as to receive dental arms with a circular cross section. The external surface 128' is rectangular or substantially rectangular, to engage with the articulatable-dental-arm engagement elements 82', 84'. Preferably there are rubber gripping elements 126c' which lie or sit on the interior surface 130'. Whilst the adaptor is described as having this form, it will be appreciated that the adaptor may have an interior surface having a different shape, for example a square, to correspond to different shaped articulatable dental arms. There may be a set of adaptors of various sizes and shaped profiles.

Each adaptor part 126a, 126b may have an attachment protrusion 126d' which is extendable or insertable through a corresponding aperture 82a', 84a' in each engagement element 82', 84'.

The articulatable-dental-arm engagement elements 82', 84' have an interior surface for defining the articulatable-dental-arm receiving portion 86' and an exterior surface. The exterior surface 82b' of the first articulatable-dental-arm engagement element 82' is here planar or substantially planar and is opposed to the interior surface. The exterior surface therefore defines a plane.

The clamp 76' includes a fastening means 96' to fasten the articulatable-dental-arm engagement elements 82', 84' together. The fastening means 96' preferably includes a first fastening projection 98' extending outwardly either side of the first part of the articulatable-dental-arm receiving portion 86*a*' of the first articulatable-dental-arm engagement element 82'. Said first fastening projection 98' preferably extends perpendicularly to the side wall of the first part 86*a*' of the articulatable-dental-arm receiving portion 86' and may be considered to be a bracket. The second articulatable-dental-arm engagement element 84' similarly has a second fastening projection 100' which extends outwardly either of the second part 86*b*' of the articulatable-dental-arm receiving portion 86'. For weight saving, each second fastening projection 100' has two parts which are spaced apart.

The fastening means 96' further includes four interengagement members 138' on the first articulatable-dental-arm engagement element 82' for engagement with and attachment to the second articulatable-dental-arm engagement element 84'. Two of the interengagement members 138' project from each first fastening projection 98' and the interengagement members 138' are spaced apart from each other. The interengagement members 138' are here cylindrical and may be considered to be shafts.

Extending through each interengagement member 138', and through the corresponding part of the first engagement element 82', is a fastener receiving aperture 102'. Each second fastening projection 100' has a corresponding fastener receiving recess which is alignable with one fastener receiving aperture of the interengagement members 138'. Although not shown, it will be appreciated that each second fastening projection may have a recess corresponding to each interengagement member. Therefore, at least part of each interengagement member may be receivable within the second fastening projection.

Whilst four interengagement members 138' are described, it will be appreciated that any number of interengagement members may be considered or there may be no interengagement members.

The clamp 76' further comprises a spacing arm 140' which here extends from the first articulatable-dental-arm engagement element 82', although it will be appreciated that it may in fact extend from the second articulatable-dental-arm engagement element. The arm 140 is elongate and may be considered to be a T-beam, having an upper flange 140*a*' and a web 140*b*', although it will be appreciated that it may in fact have other forms. The spacing arm 140' preferably extends at an angle to the fastener receiving apertures 102' which extend through the interengagement members 138' and therefore may extend at an angle to the interengagement members 138'. The spacing arm 140' is preferably unitarily formed with the first articulatable-dental-arm engagement element 82', although it will be appreciated that the two components may be separately formed.

Here the spacing arm 140' is straight, although it will be appreciated that the spacing arm may be curvate. Additionally, whilst here the spacing arm 140' is not pivotable with respect to the articulatable-dental-arm engagement elements 82', 84', it will be appreciated that it may in fact be movable and/or pivotable with respect thereto.

The clamp 76' further comprises a support attachment means 106', having a first attachment member 114' and a preferably a second attachment member 116'. The support attachment means 106' is spaced apart from the articulatable-dental-arm engagement elements 82', 84' and is here interspaced by the spacing arm 140'. The spacing arm 140' therefore extends between the support attachment means 106' and the articulatable engagement elements 82', 84'.

The second attachment member 116' preferably has a support receivable member which is here a shaft 116*a*' and may be cylindrical in shape, although other shapes may be considered. The support 80 is preferably receivable around the support receivable member 116*a*'. The second attachment member 116' further has a stop 116*b*', which may have a circular cross-section with a diameter greater than that of the shaft 116*a*'. The spacing arm 140' is attached to the support attachment means 106' at or adjacent to the stop 116*b*' of the second attachment member 116'. Here the second attachment member 106' is unitarily formed with the spacing arm and therefore is unitarily formed with the first articulatable-dental-arm engagement element 82', although it will be appreciated that these three components may be separately formed.

The support attachment means 106' is preferably positioned at or adjacent to the plane defined by the exterior surface of the exterior surface 82*b*' of the first articulatable-dental-arm engagement element 82'. More preferably the second attachment member 116' is at or adjacent to this plane and most preferably an opposing end of the second attachment member to the stop is at or adjacent to this plane. This is enabled by the spacing arm having an extent in a direction parallel to the longitudinal extent of the shaft 116*a*' of the second attachment member 116' which is equal to the longitudinal extent of the shaft 116*a*'.

The first attachment member 114' is at least in part receivable within the second attachment member 116', although it will be appreciated that the second attachment member may be receivable within the first attachment member. Here the second attachment member 116' preferably has a shaft which is receivable within the bore of the first attachment member 114', and a stop 114*b*' which has a greater diameter than the shaft 116*a*' of the first attachment member 114'. The bore of the second attachment member 116' and the shaft of the first attachment member 114' have corresponding screw threads to allow releasable and/or temporary attachment. The first attachment member 114' preferably has a handle 142' so as to allow in use manual rotation of the first attachment member 114'. Here the handle 142' is a gripping means which is on the stop 114*b*' of the first attachment member 114'. The gripping means is here an undulating circumferential extent of the stop 114*b*' which allows for easy manual engagement.

Additionally, the spacing arm 140' preferably has a support engagement member 144' which extends from the longitudinal extent of spacing arm 140' at or adjacent to the stop of the second attachment means. The support engagement member 144' preferably extends in the same direction of the longitudinal extent of the shaft 116*a*' of the second attachment member 116 so as to be abuttable with the support 80.

In use, the clamp 76' may be attached to an in use articulatable dental arm 78. The first articulatable-dental-arm engagement element 82' and the second articulatable-dental-arm engagement element 84' are attached together around the articulatable dental arm 78. Thus, said attachment of the first and second articulatable-dental-arm engagement element 82', 84' forms the articulatable-dental-arm receiving portion 86' through which the in use articulatable dental arm 78 is extendible.

To attach the first and second articulatable-dental-arm engagement elements 82', 84', the interengagement members 138' of the first articulatable-dental-arm engagement element 82' are engaged with the second articulatable-dental-arm engagement element 84', and preferably the second fastening projection 100'. If the second fastening projection 100' has interengagement member receiving recesses, the interengagement members 138' are received therein. Fasteners are inserted through the fastener receiving apertures 102' in the interengagement members 138' and through the fastener receiving recesses in the second articulatable-dental arm engagement element to attach and/or fasten the engagement elements 82', 84' together.

The in use articulatable dental arm 78, which in this instance may have a square or rectangular cross-section, is therefore engaged with and secured to the first and second parts 86a', 86b' of the dental-arm receiving portion 86'.

If the in use articulatable dental arm 78 has a circular and/or curvate cross-section, the adaptor 126' may be inserted into and/or attached to the articulatable-dental-arm receiving portion 86', before connection to the articulatable dental arm 78. The first and second parts 126a', 126b' of the adaptor 126' may be attached to the first and second parts 86a', 86b' of the articulatable-dental-arm receiving portion 86' respectively. Such attachment here takes the form of an interference fit, although it will be appreciated that fasteners may be utilised. The interference fit may be accomplished through the insertion of the attachment protrusions 126d' into the corresponding aperture 82a', 84a'. To release the adaptor 126' from the articulatable-dental-arm receiving portion 86', the protrusions 126d' may be manually forced or pushed from the apertures 82a', 84a'.

Having attached the articulatable-dental-arm engagement elements 82', 84' to the articulatable dental arm 78, the support 80 is attached to the support attachment means 106'. Here the support 80 has an attachment element with an aperture which has a diameter greater than that of the shaft 116a' of the second attachment member 116', although the diameter is less than that of the stop 114a', 116a' of the first and second attachment member 114', 116'. Therefore, the attachment element is placed around the shaft 116a' of the second attachment element 116' so that the shaft 116a' extends through the aperture. The support engagement element 144' of the spacing arm 140' preferably engages or abuts the attachment element of the support to provide lateral support and/or bracing thereto.

With the shaft of second attachment member 116' extending through the support, the first attachment member 114' is fastened to the second attachment member 116'. This may be accomplished through manually rotating the handle 142' so that the first attachment member 114' screws into the second attachment member 116'. In this way the support is attached and/or secured to the clamp 76'.

Referring the FIG. 12, there is shown a second embodiment of a dental display system 136' with the second embodiment of the clamp 76' clamped about an articulatable dental arm 78. The support 80 is attached to the support attachment means, although here the first attachment member is not shown. The portable-electronic-device holder 10, with an electronic device 20 received therein, is mounted to the support 80.

Whilst the first and second fastening projections are described as being spaced apart in use, so as to from a discontinuous articulatable-dental-arm receiving portion, it will be appreciated that this may not be necessary and the first and second fastening projections may interengage so as to form an articulatable-dental-arm receiving aperture.

Additionally, it will be appreciated that the spacing arm may be pivotable with respect to the articulatable-dental-arm engagement elements so that their relative orientations may be adjustable.

It is therefore possible to provide a portable-electronic-device holder which is able to hold a portable electronic device by engaging a front and rear surface of the portable electronic device without obstructing a user's access to an edge portion of the screen.

It is also possible to provide a clamp for attachment to an articulatable dental arm which prevents or inhibits separation of two clamping elements, through the use of a boss of one clamping element being received in the other clamping element, where a weight is suspended from the clamp.

It is lastly possible to provide a dental display system, which may be articulatable, for displaying information and/or entertainment to a patient.

The words 'comprises/comprising' and the words 'having/including' when used herein with reference to the present invention are used to specify the presence of stated features, integers, steps or components, but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of examples only, and various other modifications will be apparent to persons skilled in the field without departing from the scope of the invention as defined herein.

The invention claimed is:

1. A dental display system comprising:
an articulatable-dental-arm clamp, a support and a portable-electronic-device holder;
the articulatable-dental-arm clamp having a first articulatable-dental-arm engagement element and a second articulatable-dental-arm engagement element in use arranged to define an articulatable-dental-arm receiving portion, and a support attachment element having an attachment member;
the support having a clamp attachment aperture through which the attachment member is adapted to extend; and
the portable-electronic-device holder having a multi-part holder body including first and second device engagement elements defining a portable electronic device housing, an attachment element to retain the first and second device engagement elements of the holder body together; the first and/or second device engagement elements defining a viewing aperture to permit physical and/or optical access to the portable electronic device housing, and a mounting element on a back side of a holder body, the portable-electronic-device holder being adapted to be mounted to the support via the mounting element.

2. The dental display system as claimed in claim 1, wherein the viewing aperture of the portable-electronic-device holder has an at least in part non-rectangular perimeter to increase user access to a touchscreen of a portable electronic device received in the holder body.

3. The dental display system as claimed in claim 2, wherein the viewing aperture has at least one non-linear edge extending at least in part away from a centreline of the viewing aperture.

4. The dental display system as claimed in claim 3, wherein the non-linear edge is curvate.

5. The dental display system as claimed in claim 1, wherein the portable-electronic-device holder further includes at least one handle which extends at an angle to a plane of the viewing aperture, preferably there are two handles positioned at distal ends of the holder body to one another.

6. The dental display system as claimed in claim 1, wherein the articulatable-dental-arm clamp further includes an articulatable-dental-arm adaptor adapted to be inserted into the articulatable-dental-arm receiving portion, the articulatable dental atm adaptor having an exterior surface complementary with the articulatable-dental-arm receiving portion and an interior surface complementary with and configured to engage the articulatable dental atm.

7. The dental display system as claimed in claim 6, wherein the exterior surface of the adaptor has a rectangular cross-section and the interior surface of the adaptor has a circular lateral cross-section, or vice versa.

8. The dental display system as claimed in claim 1, wherein an end of the attachment member is at or adjacent to a plane defined by an exterior surface of the first articulatable-dental-arm engagement element.

9. The dental display system as claimed in claim 1, wherein the articulatable-dental-arm receiving portion is discontinuous.

10. The dental display system as claimed in claim 1, wherein the support attachment element includes a thither attachment member, and the attachment member and the further attachment member have complementary screw threads to provide releasable fastening therebetween.

11. The dental display system as claimed in claim 1, wherein the attachment member includes a shaft through which the support is adapted to be received, and a stop extending in a plane perpendicular to a longitudinal extent of the shaft.

12. The dental display system as claimed in claim 1, wherein the articulatable-dental-arm clamp thither includes a spacing atm which extends between the articulatable-dental-arm engagement elements and the support attachment element to provide spacing between the support and the in-use dental atm.

13. The dental display system as claimed in claim 12, wherein the articulatable-dental-arm clamp further includes a fastening element to fasten the articulatable-dental-arm engagement elements together and the dental spacing atm extends at an angle to the fastening element of the articulatable-dental-arm engagement elements and a longitudinal extent of the attachment members.

14. The dental display system as claimed in claim 12, wherein the spacing atm includes a support engagement member to engage and brace the support.

15. The dental display system as claimed in claim 12, wherein the spacing atm, first articulatable-dental-arm engagement element and attachment member are unitarily formed.

16. A portable-electronic-device support assembly configured to be attached to an articulatable dental atm, the portable-electronic-device support assembly comprising:
a support for a portable electronic device;
an articulatable-dental-arm clamp having a first articulatable-dental-arm engagement element and a second articulatable-dental-arm engagement element in use arranged to define an articulatable-dental-arm receiving portion, a fastening element to fasten the first and second articulatable-dental-arm engagement elements to each other so that the first and second articulatable-dental-arm engagement elements engage at least a portion of the in use articulatable dental aim, and a support attachment element to attach the support to the articulatable-dental-arm engagement elements, the support attachment element being spaced apart from the fastening element and comprising a first attachment member and a second attachment member, the first attachment member being at least in part adapted to be received within and fastened to the second attachment member to prevent separation of the first and second attachment members.

17. The dental display system as claimed in claim 1, further comprising a battery receiver on a back side of the holder body, the battery receiver configured to receive a battery to power an in use portable electronic device received in the holder body, the mounting element being on the battery receiver.

18. The dental display system as claimed in claim 17, wherein the battery receiver is a battery recess having a slot-shaped opening.

19. The dental display system as claimed in claim 18, wherein the battery recess further comprises a battery engagement slot which extends through a battery recess wall to enable removal of the battery.

\* \* \* \* \*